(12) United States Patent
Jordan et al.

(10) Patent No.: US 11,753,092 B2
(45) Date of Patent: Sep. 12, 2023

(54) INTERCHANGEABLE TRACK SYSTEMS

(71) Applicant: G&R Manufactured Solutions LLC, Stonewall, LA (US)

(72) Inventors: Glyn Jordan, Collinston, LA (US); Robert Reeves, Stonewall, LA (US)

(73) Assignee: G&R Manufactured Solutions LLC, Stonewall, LA (US)

( * ) Notice: Subject to any disclaimer, the term of this patent is extended or adjusted under 35 U.S.C. 154(b) by 418 days.

(21) Appl. No.: 17/106,497

(22) Filed: Nov. 30, 2020

(65) Prior Publication Data

US 2021/0163085 A1 Jun. 3, 2021

Related U.S. Application Data

(60) Provisional application No. 62/942,434, filed on Dec. 2, 2019.

(51) Int. Cl.
| | |
|---|---|
| *B62D 55/04* | (2006.01) |
| *B62D 55/084* | (2006.01) |
| *B62D 55/125* | (2006.01) |
| *B62D 55/065* | (2006.01) |
| *B62D 55/10* | (2006.01) |
| *B62D 55/14* | (2006.01) |
| *B62D 25/20* | (2006.01) |

(Continued)

(52) U.S. Cl.
CPC ......... *B62D 55/04* (2013.01); *B62D 25/2072* (2013.01); *B62D 55/0655* (2013.01); *B62D 55/084* (2013.01); *B62D 55/10* (2013.01); *B62D 55/125* (2013.01); *B62D 55/14* (2013.01); *B62D 55/20* (2013.01); *A01G 23/00* (2013.01)

(58) Field of Classification Search
CPC .... B62D 65/12; B62D 55/0655; B62D 55/04; B62D 55/084
See application file for complete search history.

(56) References Cited

U.S. PATENT DOCUMENTS 2,618,349 A 11/1952 Ludema
3,670,835 A * 6/1972 Ross ......................... E02F 3/80
180/69.1

(Continued)

*Primary Examiner* — Jacob D Knutson
*Assistant Examiner* — Hosam Shabara
(74) *Attorney, Agent, or Firm* — R. Keith Harrison

(57) ABSTRACT

Interchangeable track systems for interchangeable deployment with vehicle wheels on a forestry harvester vehicle having a front axle and a rear axle may include a pair of front roller frame mount arms and a pair of rear roller frame mount arms configured for mounting on the front axle and the rear axle, respectively. A pair of front track assemblies and a pair of rear track assemblies may be configured for removable mounting on the pair of front roller frame mount arms and the pair of rear roller frame mount arms, respectively. Each of the pair of front track assemblies and the pair of rear track assemblies may include an elongated roller frame configured for pivotal attachment to the corresponding one of the pair of front roller frame mount arms and pair of rear roller frame mount arms. A front idler roller and a rear idler roller may be carried by the roller frame. A track may be trained on the front idler roller and the rear idler roller. A sprocket may be configured for driving engagement by a corresponding one of the front axle and the rear axle, with the sprocket drivingly engaging the track.

20 Claims, 15 Drawing Sheets

(51) Int. Cl.
*B62D 55/20* (2006.01)
*A01G 23/00* (2006.01)

(56) References Cited

U.S. PATENT DOCUMENTS

| | | | |
|---|---|---|---|
| 3,957,167 A | | 5/1976 | Jacobson et al. |
| 4,953,919 A | | 9/1990 | Langford |
| 5,312,176 A | * | 5/1994 | Crabb .................... B62D 55/30 |
| | | | 180/9.1 |
| 5,607,210 A | | 3/1997 | Brazier |
| 5,829,848 A | * | 11/1998 | Kelderman ............ B62D 55/04 |
| | | | 305/15 |
| 6,176,334 B1 | | 1/2001 | Lorenzen |
| 8,245,800 B2 | | 8/2012 | Hansen |
| 8,801,115 B2 | * | 8/2014 | Hansen .............. B62D 49/0635 |
| | | | 180/9.26 |
| 8,827,013 B2 | * | 9/2014 | Hansen .............. B62D 49/0635 |
| | | | 180/9.62 |
| 9,079,614 B2 | | 7/2015 | Hansen |
| 9,505,454 B1 | * | 11/2016 | Kautsch ................ B62D 55/10 |
| 10,150,523 B2 | | 12/2018 | Erickson |
| 10,597,098 B2 | * | 3/2020 | Vik .................... B62D 55/1086 |
| 2004/0041415 A1 | | 3/2004 | Hamm |
| 2015/0048671 A1 | | 2/2015 | Hansen |
| 2015/0329154 A1 | | 11/2015 | Roy |
| 2017/0057571 A1 | | 2/2017 | Ponsse |

\* cited by examiner

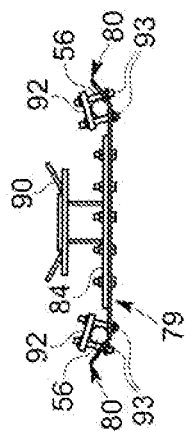
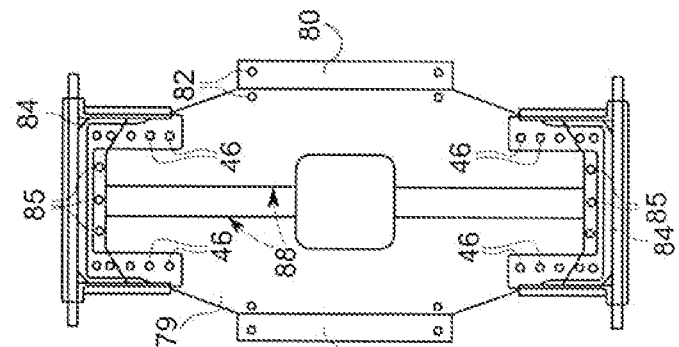
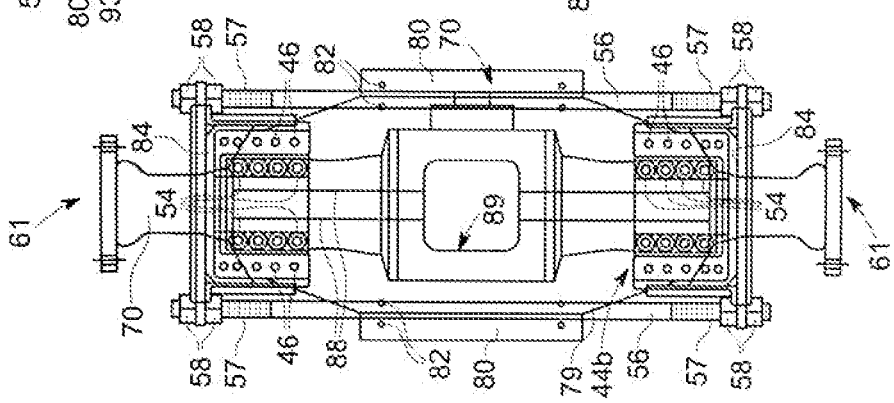
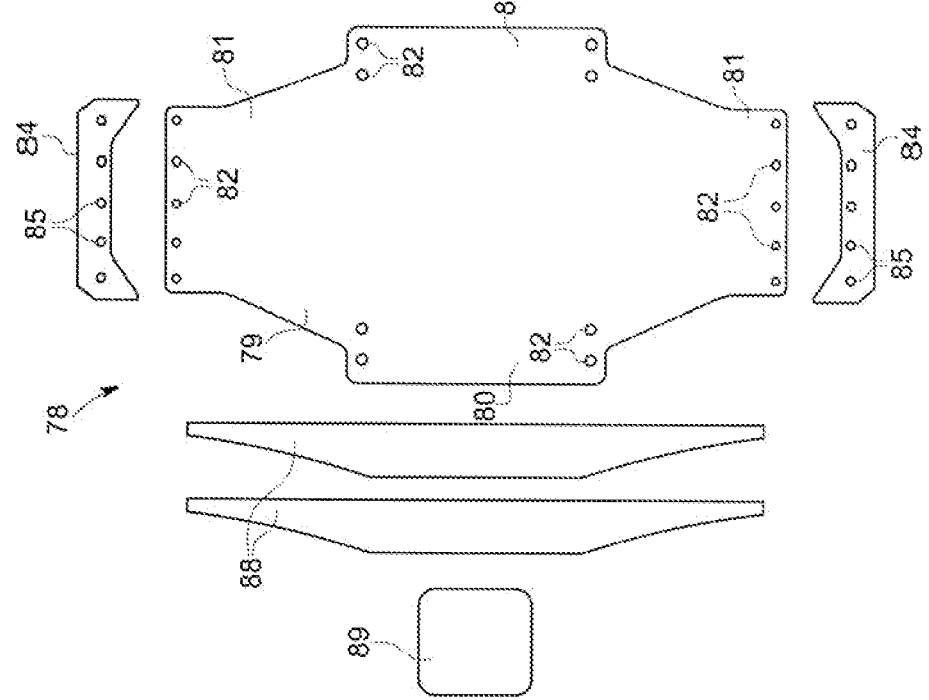
FIG. 24
FIG. 23
FIG. 22
FIG. 21

INTERCHANGEABLE TRACK SYSTEMS

CROSS-REFERENCE TO RELATED APPLICATIONS

This application claims the benefit of U.S. provisional application No. 62/942,434, filed Dec. 2, 2019 and entitled INTERCHANGEABLE TRACK SYSTEMS, which provisional application is hereby incorporated by reference herein in its entirety.

FIELD

Illustrative embodiments of the disclosure relate to forestry harvester vehicles used for felling, delimbing and buckling trees. More particularly, illustrative embodiments of the disclosure relate to axle-mounted interchangeable track systems which facilitate interchangeable attachment of tracks and wheels on a forestry harvester vehicle to provide higher ground clearance, lower stabilizing center of gravity, facilitate less destructive and yet more aggressive traction properties and lower ground pressure for wet, soft or irregular terrain.

BACKGROUND

The background description provided herein is solely for the purpose of generally presenting the context of the illustrative embodiments of the disclosure. Aspects of the background description are neither expressly nor impliedly admitted as prior art against the claimed subject matter.

In the forestry industry, jobsite production is frequently inhibited by negative impact to property, accessibility during and after weather events, and equipment limitations in severely saturated soil and/or extreme elevation changes. Soft, wet soil conditions are often unable to adequately support the weight and traffic of conventionally configured machinery without excessive work area degradation and machine wear. Consequently, damage to the environment and stress to equipment occurs, frequently causing jobsites to shut down. Under adverse conditions, work must be limited, relocated, postponed or cancelled. Certain lowland areas may be rendered permanently inaccessible.

SUMMARY

Illustrative embodiments of the disclosure are generally directed to interchangeable track systems for interchangeable deployment with vehicle wheels on a forestry harvester vehicle having a front axle and a rear axle. An illustrative embodiment of the interchangeable track systems may include a pair of front roller frame mount arms and a pair of rear roller frame mount arms configured for mounting on the front axle and the rear axle, respectively, of the forestry harvester vehicle. A pair of front track assemblies and a pair of rear track assemblies may be configured for removable mounting on the pair of front roller frame mount arms and the pair of rear roller frame mount arms, respectively. Each of the pair of front track assemblies and the pair of rear track assemblies may include an elongated roller frame configured for pivotal attachment to each corresponding one of the pair of front roller frame mount arms and pair of rear roller frame mount arms. A front idler roller and a rear idler roller may be carried by the roller frame. A track may be trained on the front idler roller and the rear idler roller. A sprocket may be configured for driving engagement by a corresponding one of the front axle and the rear axle, with the sprocket drivingly engaging the track.

BRIEF DESCRIPTION OF THE DRAWINGS

Illustrative embodiments of the disclosure will now be described, by way of example, with reference to the accompanying drawings, in which:

FIG. 21 is an exploded top view of a typical skid pan assembly of the interchangeable track system;

FIG. 22 is a top view of the skid pan assembly deployed on the front axle of the forestry harvester vehicle;

FIG. 23 is a top view of the assembled skid pan assembly with the front axle of the forestry harvester vehicle omitted for clarity;

FIG. 24 is an end view of the assembled skid pan assembly illustrated in FIG. 23;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
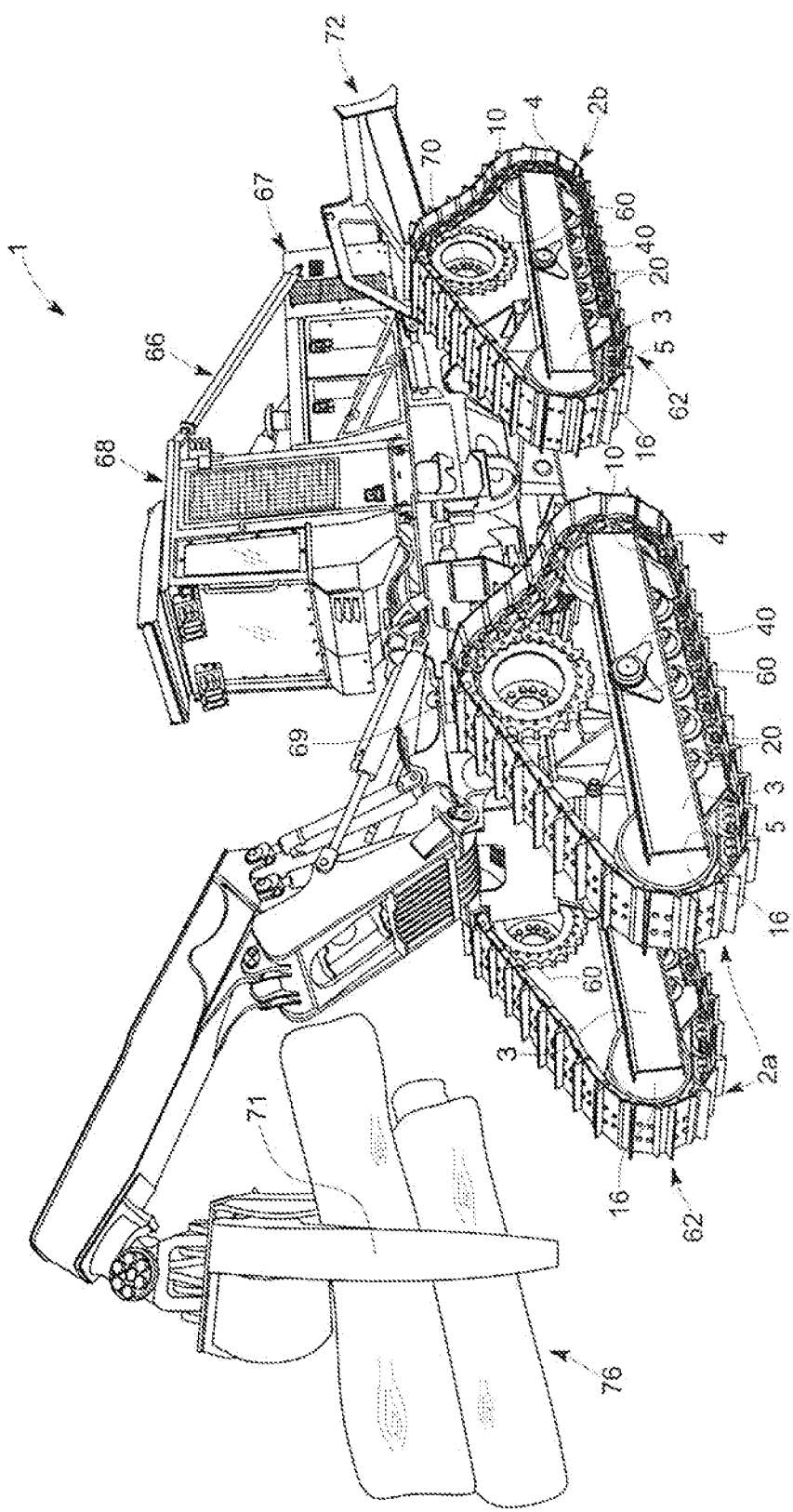
FIG. 1 is a right hand rearward side perspective view of a forestry harvester vehicle with an illustrative embodiment of the interchangeable track systems fitted on the vehicle.
Figure 2:
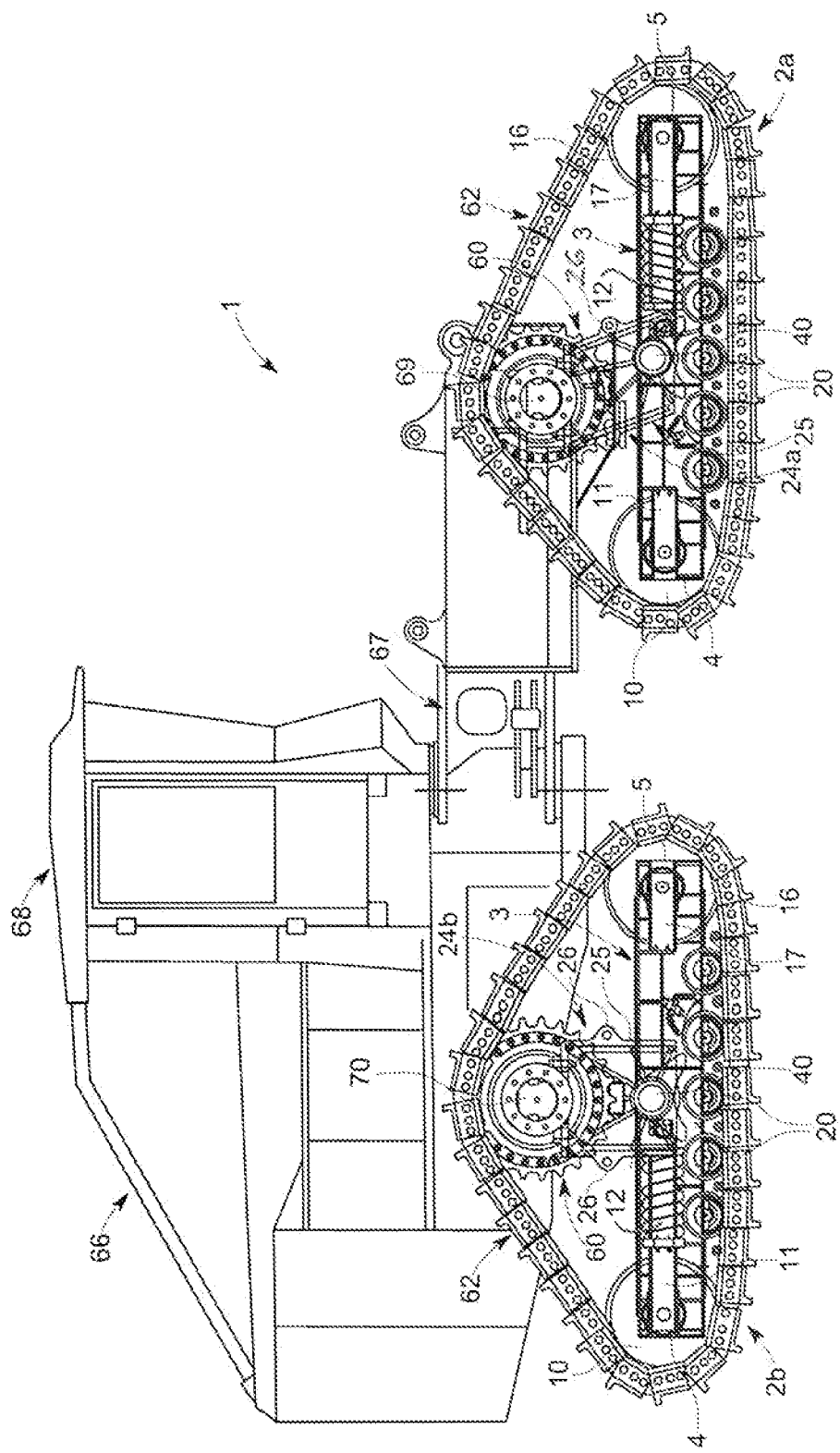
FIG. 2 is a side view of the forestry harvester vehicle with interchangeable track system illustrated in FIG. 1.
Figure 3:
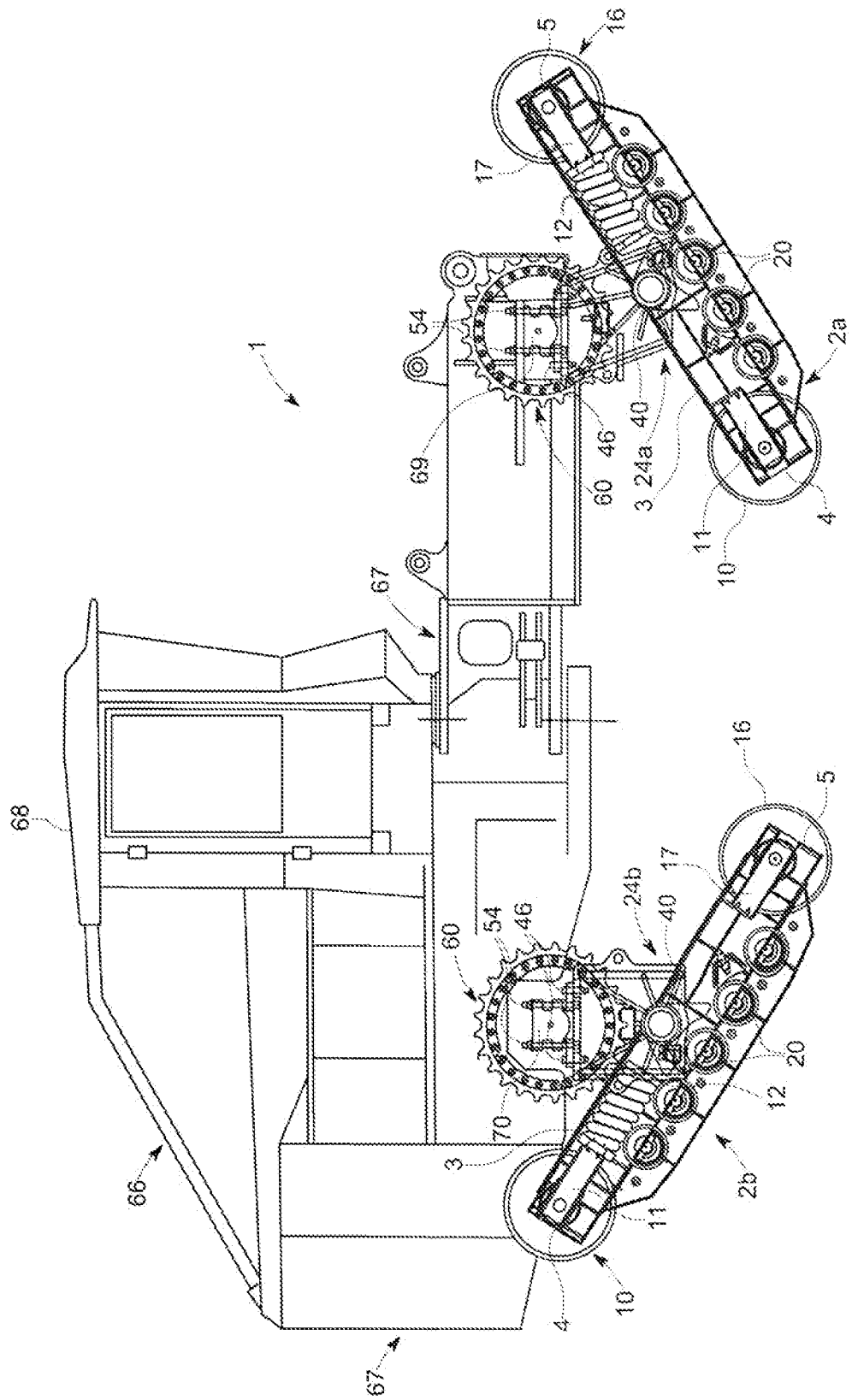
FIG. 3 is a side view of the forestry harvester vehicle with interchangeable track system, with the track removed from each track assembly on the vehicle and the track assembly disposed in a pivoted configuration relative to the chassis of the vehicle.

Referring to the drawings, an illustrative embodiment of the interchangeable track system is generally indicated by reference numeral 1. As illustrated in FIGS. 1-3 and will be hereinafter further described, the interchangeable track system 1 may be configured for deployment on a forestry harvester vehicle 66 which may be used for felling, delimbing and buckling trees. The forestry harvester vehicle 66 may have a standard or conventional design with a vehicle chassis 67 and a cab 68, a rear axle 69 and a front axle 70 on the vehicle chassis 67. As illustrated in FIG. 1, a boom-operated grapple 71 may be provided on a rear end of the vehicle chassis 67 for grasping, lifting, gathering and carrying cut tree segments 76. In some applications, a push blade 72 may be provided on a front end of the vehicle chassis 67 for pushing and moving earth, logs, tree segments and other materials. Other forestry harvester vehicles may be provided with front-mounted, powered saws or shear heads for performing the tree cutting and felling operations.

Figure 5:
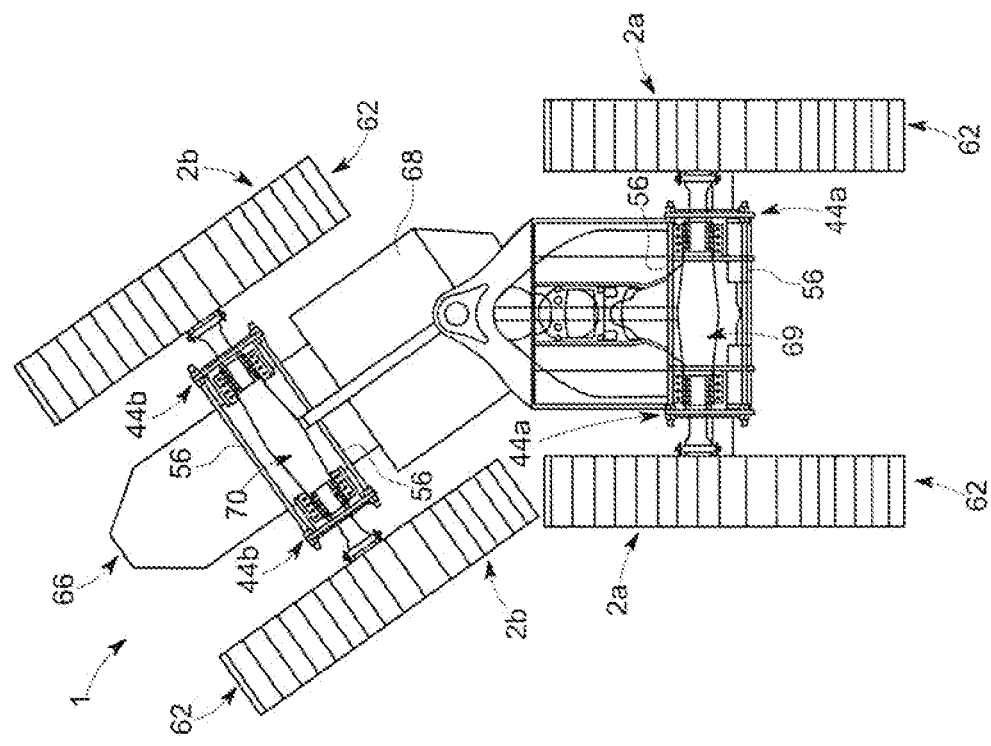
FIG. 5 is a top view of the forestry harvester vehicle with the front track assemblies steered to the left relative to the rear track assemblies of the system.
Figure 4:
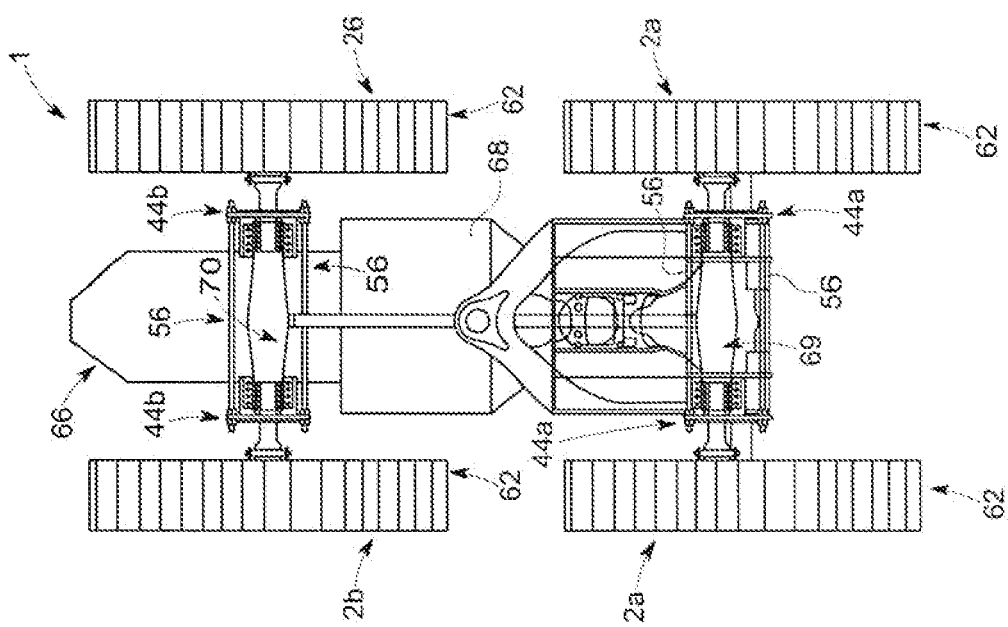
FIG. 4 is a top view of the forestry harvester vehicle with the illustrative interchangeable track system, with the front track assemblies oriented in a straight position relative to the rear track assemblies of the system.
Figure 8:
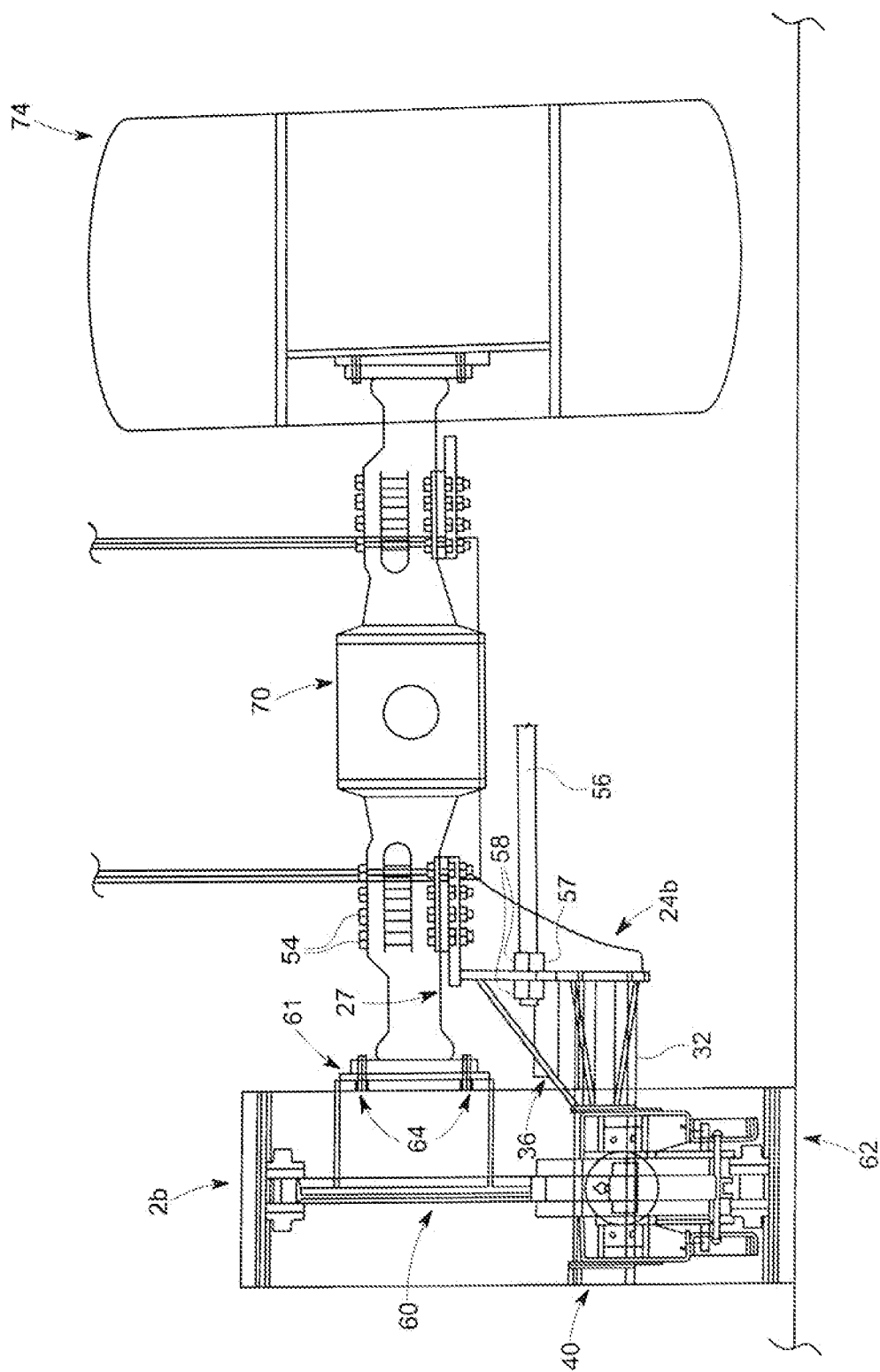
FIG. 8 is a front view of the front axle of the vehicle with one vehicle wheel mounted on one end of the front axle and a front track assembly mounted on the other end of the front axle and engaging level ground.

As further illustrated in FIGS. 1-3, the interchangeable track system 1 may include a pair of rear track assemblies 2a and a pair of front track assemblies 2b mounted on the rear axle 69 and the front axle 70, respectively, of the forestry harvester vehicle 66. The rear track assemblies 2a and the front track assemblies 2b may be mounted in interchangeable relationship with respect to the vehicle wheels 74 (one of which is illustrated in FIG. 8) on the rear axle 69 and the front axle 70. Also illustrated in FIG. 8 is the additional ground clearance gained by deployment of the interchangeable track system 1, comparing a front track assembly 2b mounted on the left to a standard or conventional vehicle wheel 74 mounted on the right of the front axle 70. Lower center of gravity may also be realized using this comparison. Accordingly, the rear track assemblies 2a and the front track assemblies 2b may enable the forestry harvester vehicle 66 to traverse soft soil and other terrain which may not be feasible by traversing the terrain with the vehicle wheels 74. Additionally, the rear track assemblies 2a and the front track assemblies 2b may enable the forestry harvester vehicle 66 to traverse steep terrain in the felling of timber and retrieval and transport of the cut tree segments 76. The rear track assemblies 2a and the front track assemblies 2b of the interchangeable track system 1 may thus be mounted on the forestry harvester vehicle 66 in interchangeable relationship with respect to the vehicle wheels 74 (FIG. 8) depending on which is optimal to enable the forestry harvester vehicle 66 to traverse the terrain for a particular application. As illustrated in FIGS. 4 and 5, the interchangeable track system 1 may enable independent steering of the rear track assemblies 2a relative to the front track assemblies 2b throughout operation of the forestry harvester vehicle 66.

Figure 6:
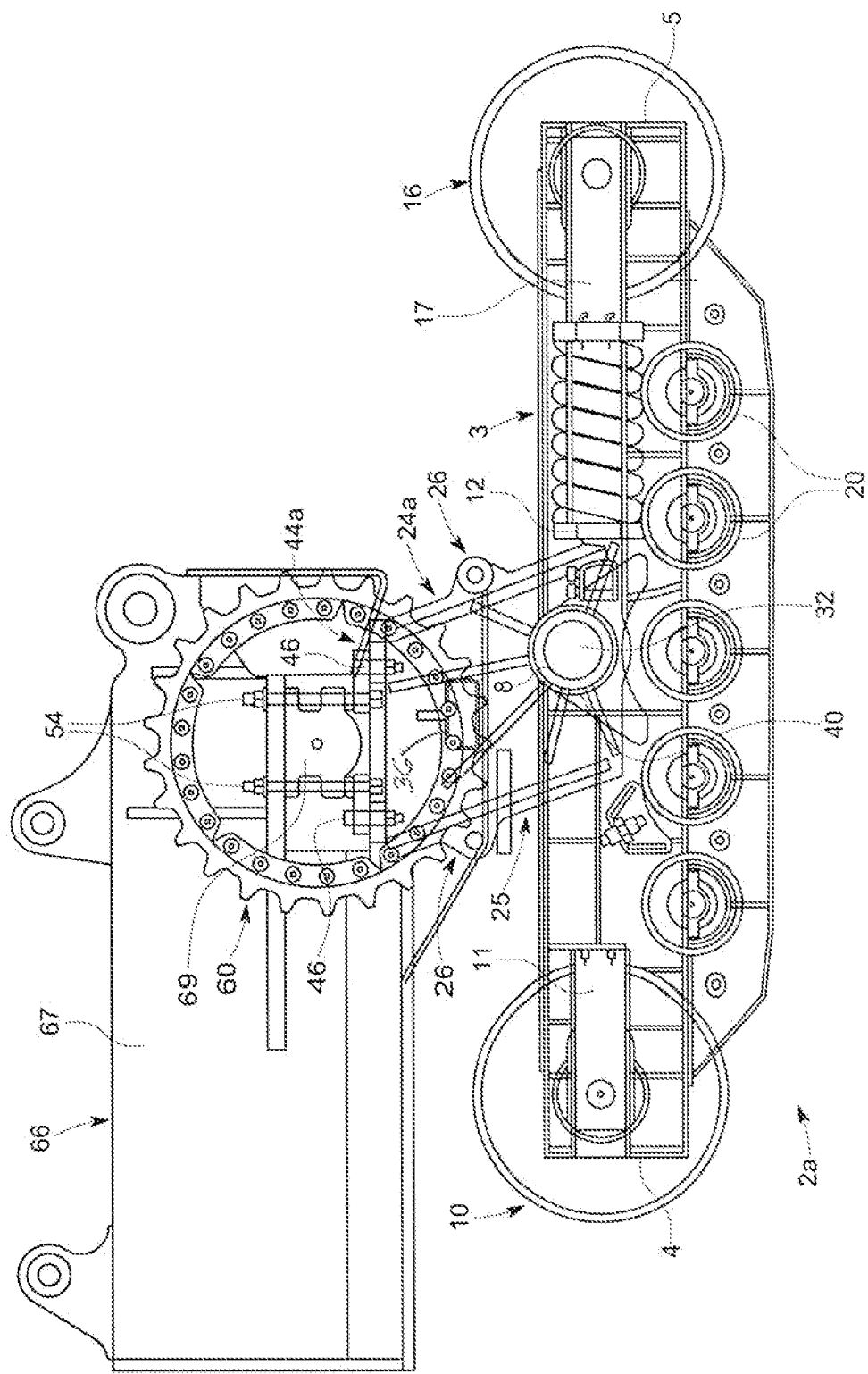
FIG. 6 is a side view of a typical rear track assembly of the system with the track removed from the assembly for clarity.

Each rear track assembly 2a and each front track assembly 2b may include an elongated roller frame 3. The roller frame 3 may have a front roller frame end 4 and a rear roller frame end 5. As illustrated in FIG. 6, a front roller arm 1 and a rear roller arm 17 may be mounted on the roller frame 3 according to the knowledge of those skilled in the art. A front idler roller 10 may be journaled for rotation on the front roller arm 11 at the front roller frame end 4 of the roller frame 3. A rear idler roller 16 may be journaled for rotation on the rear roller arm 17 at the rear roller frame end 5 of the roller frame 3. On each rear track assembly 2a, a hydraulic track adjuster/recoil spring assembly unit 12 may engage the rear roller arm 17 to bias the rear idler roller 16 rearwardly. On each front track assembly 2b, a hydraulic track adjuster/recoil spring assembly unit 12 may in like manner engage the front roller arm 11 to bias the front idler roller 10 forwardly. A plurality of spaced-apart bottom rollers 20 may be mounted on the roller frame 3 between the front roller arm 11 and the rear roller arm 17. As illustrated in FIG. 6, a pivot shaft opening 8 may extend laterally through the roller frame 3 substantially equidistant between the front roller frame end 4 and the rear roller frame end 5 at the center of gravity of the roller frame 3 for purposes which will be hereinafter described.

Figure 7:
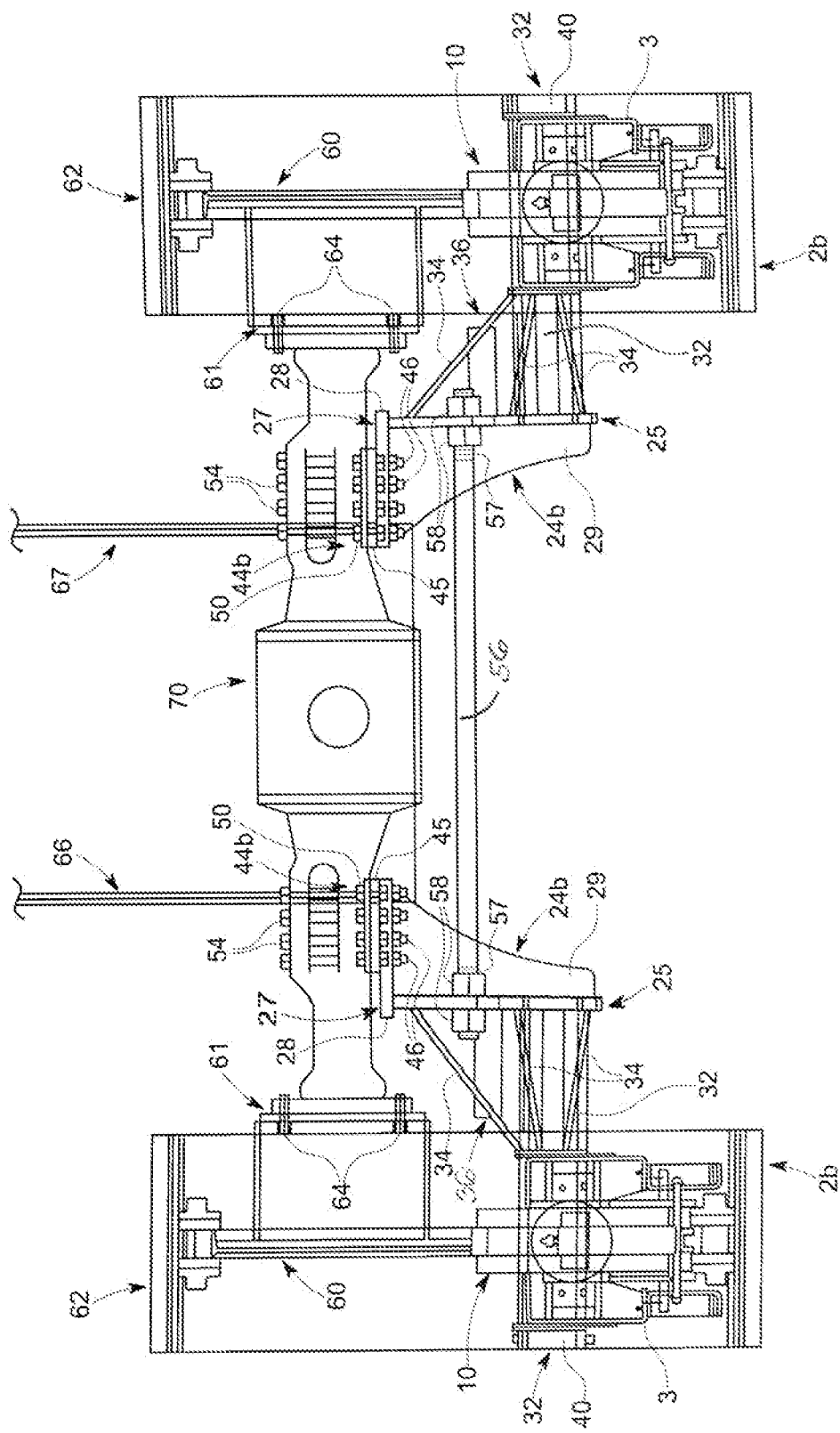
FIG. 7 is a front view of a pair of front track assemblies mounted on the front axle of the vehicle in typical application of the interchangeable track system.
Figure 9:
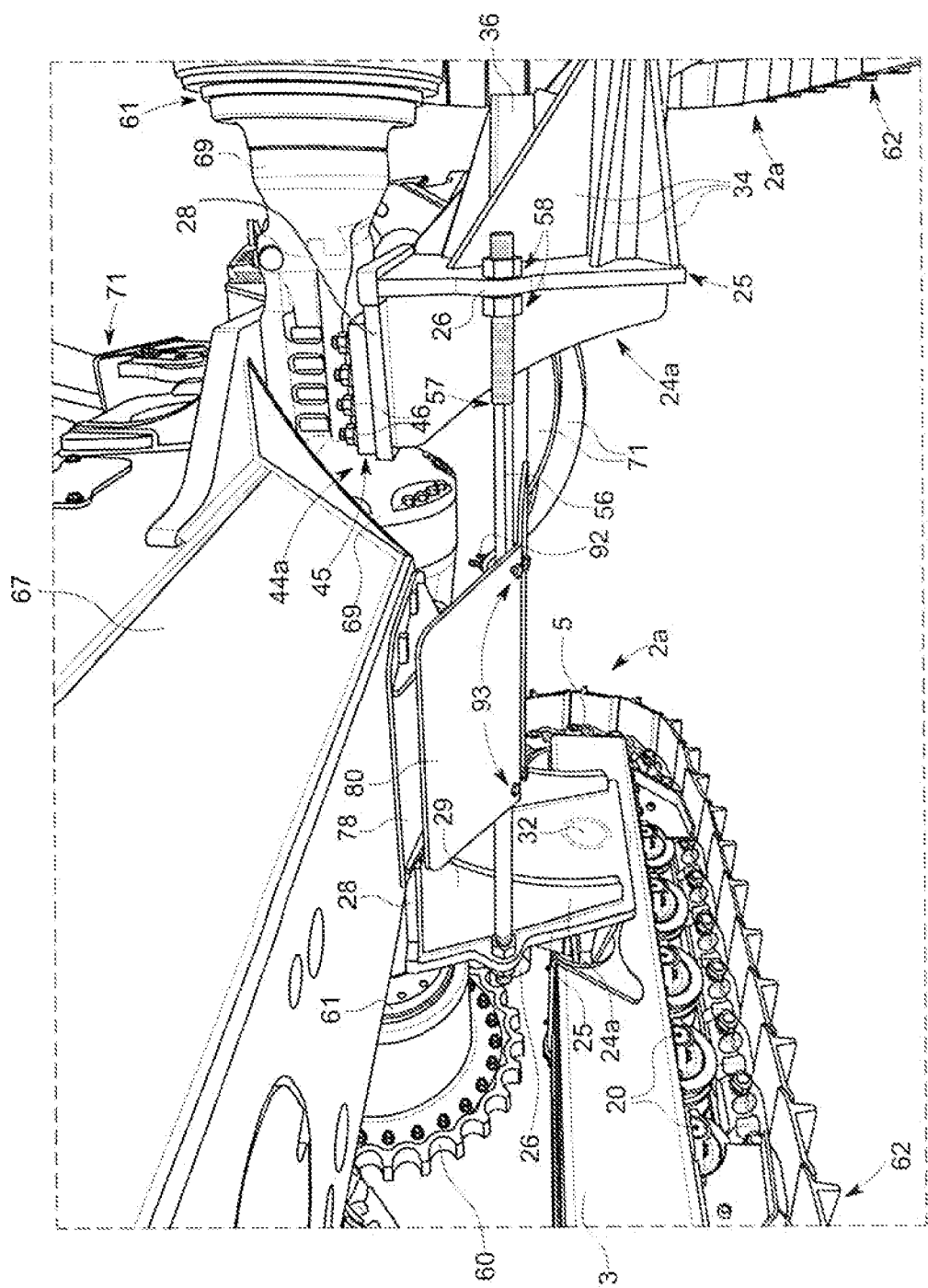
FIG. 9 is a front perspective view of a typical rear track assembly of the interchangeable track system, deployed on the rear axle of the forestry harvester vehicle.
Figure 10:
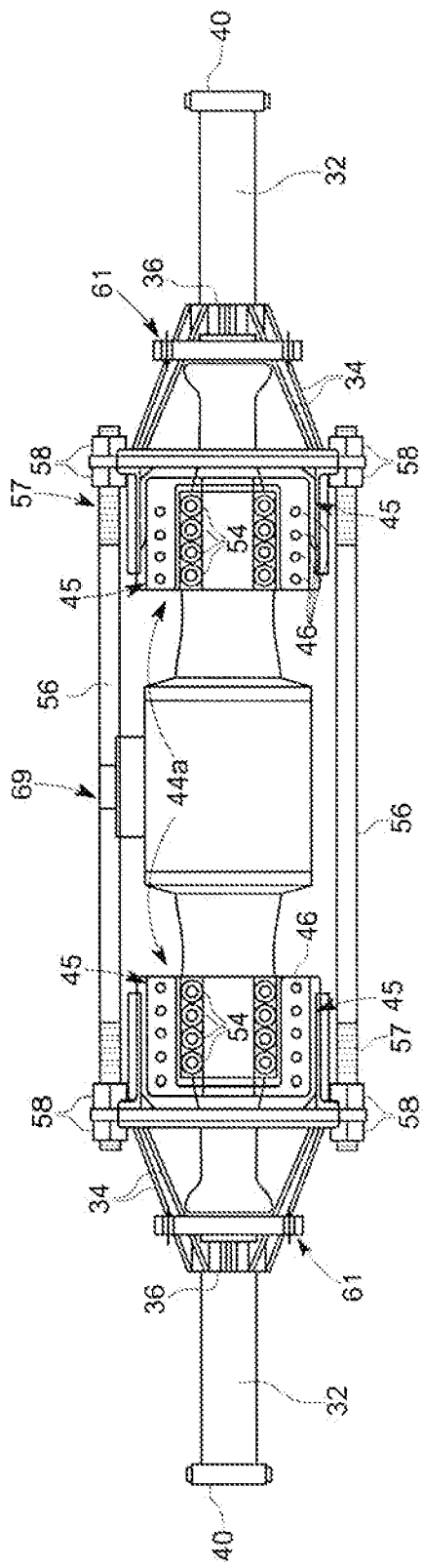
FIG. 10 is a top view of a pair of rear track assembly mounting plates (pivot shafts extended) and connector rods of the interchangeable track system deployed on the rear axle of the vehicle.
Figure 11:
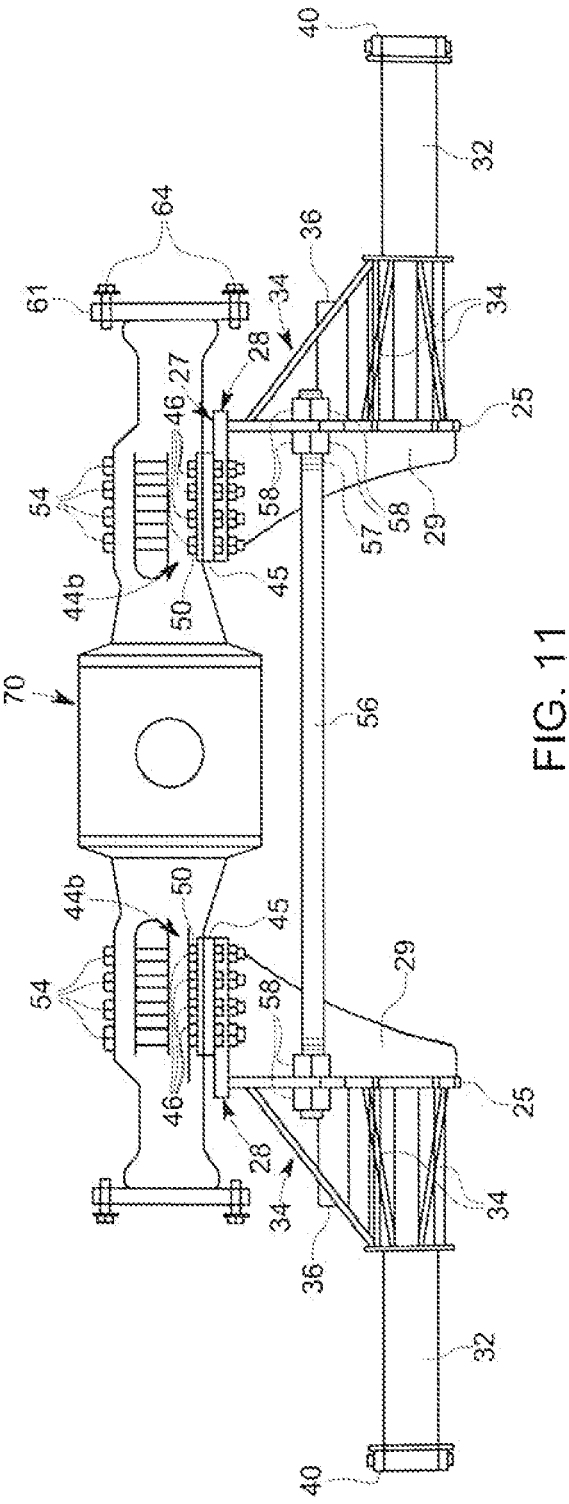
FIG. 11 is a front view of a pair of front track mounting plates (pivot shafts extended) of the interchangeable track system with a pair of connecting rods (one rearmost of which is hidden) connecting the front track assembly mounting plates.
Figure 13:
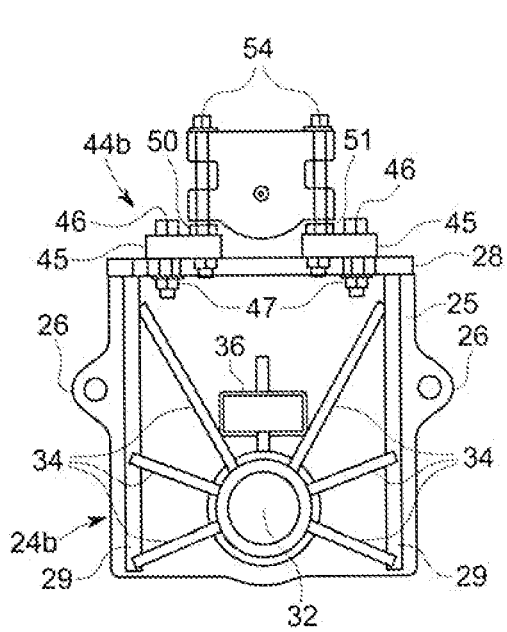
FIG. 13 is a side view of a typical front roller frame mount arm of an assembled front arm mount assembly on a front track assembly of the interchangeable track system, with the front roller frame mount arm fastened to on the front axle of the vehicle.
Figure 14:
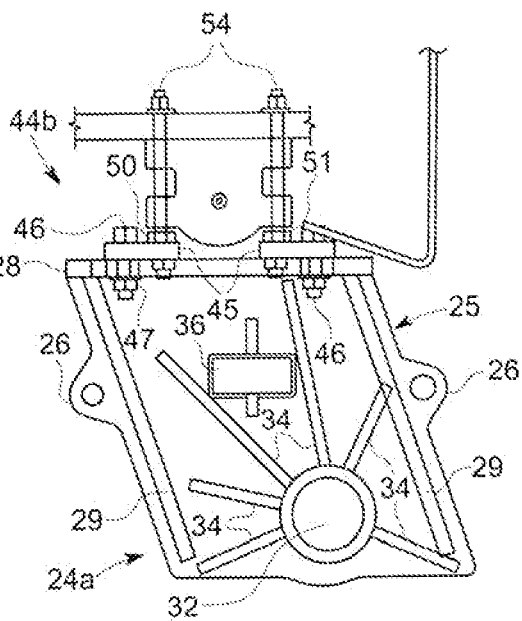
FIG. 14 is a side view of a typical rear roller frame mount arm of an assembled rear arm mount assembly on a rear track assembly of the interchangeable track system, with the rear roller frame mount arm fastened to on the rear axle of the vehicle.
Figure 15:
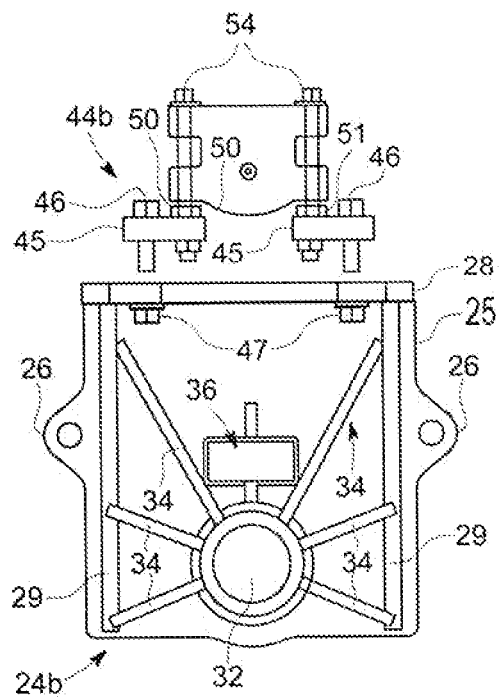
FIG. 15 is a side view of the roller frame mount arm of the disassembled front arm mount assembly, unfastened and removed from the front axle of the vehicle, with the connector and camber plates remaining in place for later redeployment of the system on the vehicle.
Figure 16:
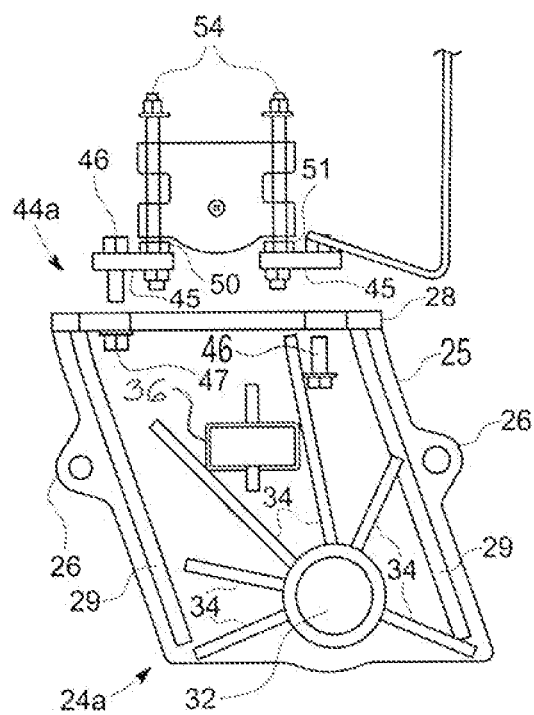
FIG. 16 is a side view of the roller frame mount arm of the disassembled rear arm mount assembly, unfastened and removed from the rear axle of the vehicle, with the connector and camber plates remaining in place for later redeployment of the system on the vehicle.
Figures 17, 18:
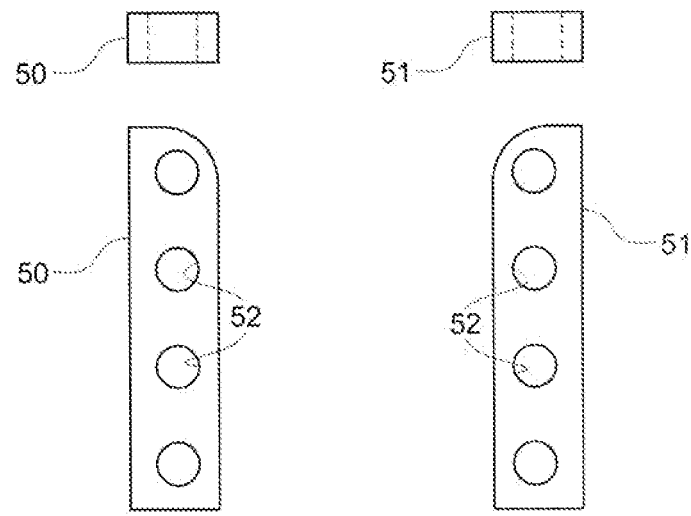
FIG. 17 is a top view (lower figure) and end view (upper figure) of a typical left-hand tapered camber block spacer of each of the front arm mount assembly and the rear arm mount assembly.
FIG. 18 is a top view (lower figure) and end view (upper figure) of a typical right-hand tapered camber block spacer of each of the front arm mount assembly and the rear arm mount assembly.
Figures 19, 20:
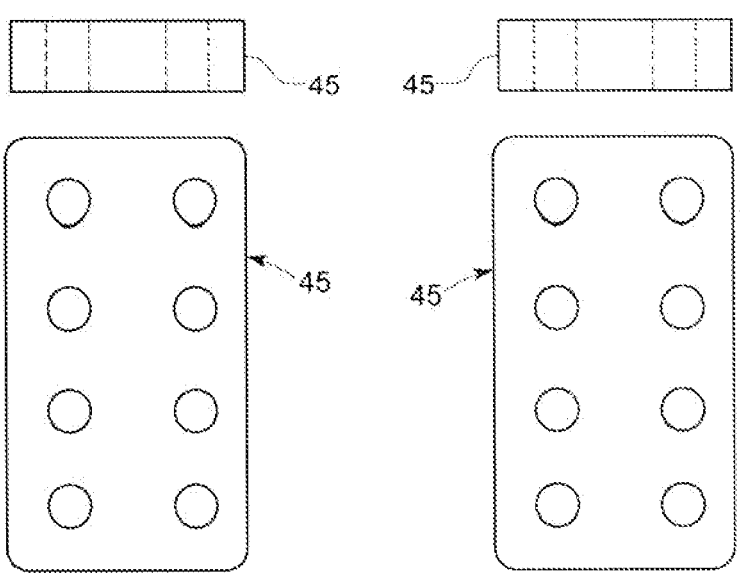
FIG. 19 is a top view (lower figure) and end view (upper figure) of a typical left-hand connector block used to connect the left tapered camber block spacer to the roller frame mount arm.
FIG. 20 is a top view (lower figure) and end view (upper figure) of a typical right-hand connector block used to connect the right tapered camber block spacer to the roller frame mount arm.
Figure 25:
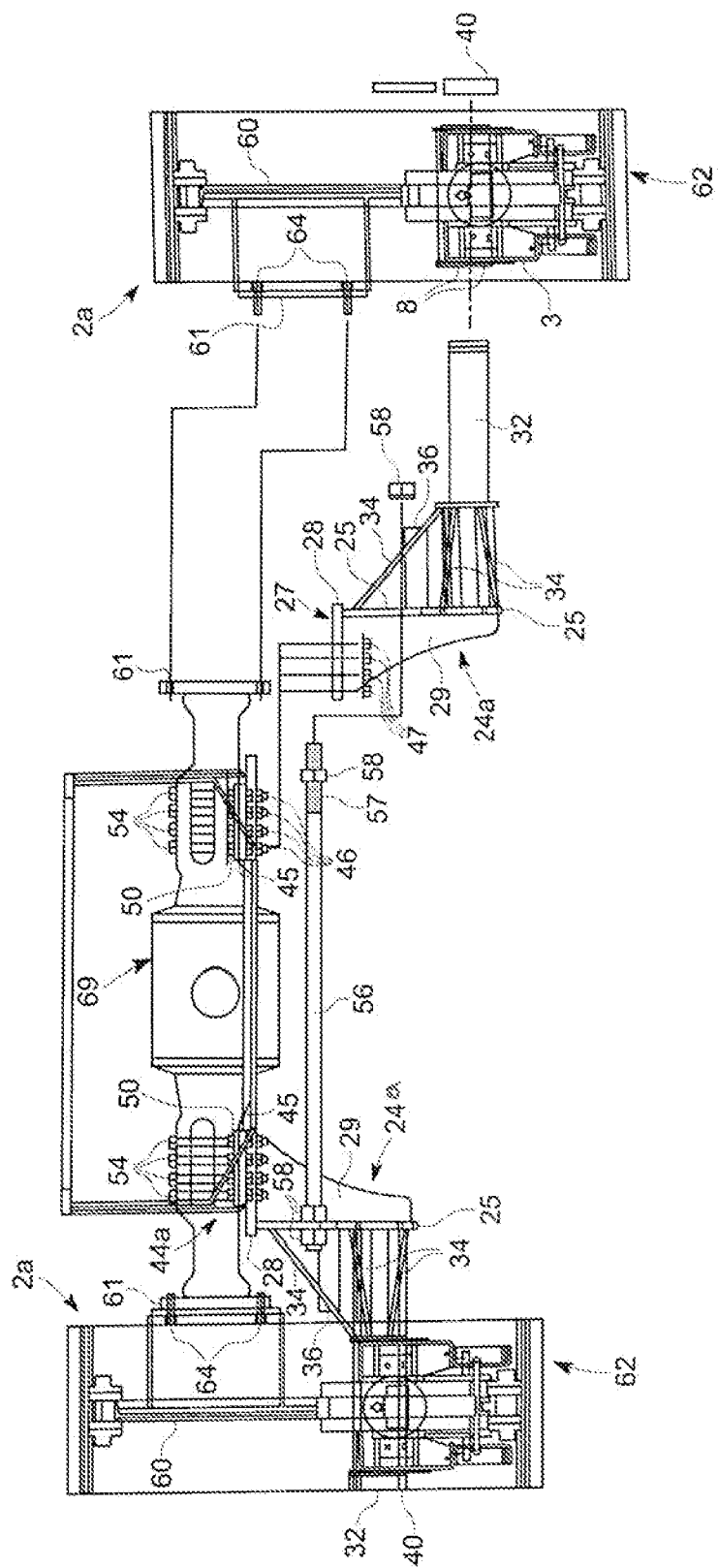
FIG. 25 contrasts an exploded front view of the rear interchangeable track system, more particularly illustrating an alternative, two-step method of deploying the system on and removing the system from the front axle of the forestry harvester vehicle.

An endless track 62 may be trained around the front idler roller 10, the rear idler roller 16 and the bottom rollers 20. The track 62 may be fabricated of steel and may have a standard or conventional track design or construction, A roller frame mount arm 24 may pivotally mount the roller frame 3 of each rear track assembly 2a and each front track assembly 2b to the corresponding end of the rear axle 69 or front axle 70, respectively, of the forestry harvester vehicle 66 typically at the pivot shaft opening 8. As illustrated in FIGS. 7, 9 and 25, a pair of rear roller frame mount arms 24a (FIGS. 9 and 25) may mount the roller frames 3 of the rear track assemblies 2a to the respective ends of the rear axle 69. In like manner, a pair of front roller frame mount arms 24b (FIG. 7) may mount the roller frames 3 of the front track assemblies 2b to the respective ends of the front axle 70. As illustrated in FIG. 25, each rear roller frame mount arm 24a (and each front roller frame mount arm 24b, not shown) may include a pivoting shaft frame 25. As illustrated in FIGS. 13 and 15, the shaft frame 25 of each front roller frame mount arm 24b may be generally elongated and rectangular. As illustrated in FIGS. 14 and 16, the shaft frame 25 of each rear roller frame mount arm 24a may have a parallelogram shape. A pair of rod eyes 26 may extend from the opposite front and rear sides of each shaft frame 25 for purposes which will be hereinafter described.

As illustrated in FIG. 7, each rear track assembly 2a and each front track assembly 2b may include a sprocket 60 which is releasably and drivingly engaged for rotation by the corresponding rear axle 69 and front axle 70. The sprocket 60 may be drivingly coupled to the corresponding rear axle 69 or front axle 70 according to any suitable technique known by those skilled in the art. In some embodiments, the sprocket 60 may be attached to the standard or conventional wheel attachment interface 61 on the rear axle 69 and front axle 70 using a plurality of sprocket fasteners 64. Accordingly, responsive to driving rotation by the rear axle 69 and front axle 70, each sprocket 60 drivingly engages the track 62 of the corresponding rear track assembly 2a and front track assembly 2b to traverse the front idler roller 10, the rear idler roller 16 and the bottom rollers 20 (FIGS. 1-3). The rear idler roller 16 (FIG. 6), biased by the hydraulic track adjuster/recoil spring assembly unit 12 via the rear roller arm 17, may tension the track 62 via the rear roller arm 17. In like manner, the front idler roller 10, bias by its corresponding hydraulic track adjuster/recoil spring assembly unit 12 via the front roller arm 11, may tension the track 62 via the front roller arm 11.

As further illustrated in FIG. 25, an arm mount frame 27 may extend inwardly (toward the longitudinal midline of the forestry harvester vehicle 66) from the shaft frame 25. The arm mount frame 27 may include a top frame plate 28 which may be substantially perpendicular to the plane of the shaft frame 25. A pair of parallel, spaced-apart, front and rear side frame plates 29 may extend from the shaft frame 25 beneath the top frame plate 28.

An elongated roller frame pivot mount shaft 32 may extend outwardly (away from the longitudinal midline of the forestry harvester vehicle 66) from the shaft frame 25. A plurality of shaft mount plates 34 may extend between the shaft frame 25 and the roller frame pivot mount shaft 32 for shaft reinforcing purposes. The roller frame pivot mount shaft 32 may be suitably sized and configured to removably receive the companion pivot shaft opening 8 (FIG. 6) in the corresponding roller frame 3 to pivotally mount the roller frame 3 on the roller frame pivot mount shaft 32. A shaft cap 40 may be detachably attached to the extending or distal end of the roller frame pivot mount shaft 32 to secure or retain the roller frame 3 on the roller frame pivot mount shaft 32.

As illustrated in FIGS. 6, 13-16 and 25, in some embodiments, a forklift insertion frame 36 may extend outwardly from the shaft frame 25 typically between the shaft mount plates 34 of each rear roller frame mount arm 24a and each front roller mount frame arm 24b. The forklift insertion frame 36 may be suitably sized and configured to receive a forklift blade (not illustrated) on a forklift to facilitate raising and lowering of each corresponding rear track assembly 2a and front track assembly 2b in installation and removal of the interchangeable track system 1 on and from, respectively, the forestry harvester vehicle 66, as will be hereinafter further described.

A pair of rear arm mount assemblies 44a may removably mount the rear roller frame mount arms 24a to the respective ends of the rear axle 69. In like manner, a pair of front arm mount assemblies 44b may removably mount the front roller frame mount arms 24b to the respective ends of the front axle 70. As illustrated in FIGS. 10 and 13-20, each rear arm mount assembly 44a and each front arm mount assembly 44b may include a pair of elongated, parallel, spaced-apart front and rear base mount blocks 45 which may rest on the top frame plate 28 of the arm mount frame 27 on each corresponding rear arm mount assembly 44a and front arm mount assembly 44b. As illustrated in FIGS. 13-16, a plurality of block fasteners 46 with securing nuts 47 may secure the top frame plate 28 to each base mount block 45. A left camber block spacer 50 and a right camber block spacer 51 may be provided on the respective base mount blocks 45. As illustrated in FIGS. 17-20, a plurality of spaced-apart axle mount fastener openings 52 may extend through each of the left camber block spacer 50 and the right camber block spacer 51. The axle mount fastener openings 52 may align or register with respective base mount block openings (not illustrated) in each corresponding underlying base mount block 45. Accordingly, a plurality of axle fasteners 54 may be extended through respective axle fastener openings (not illustrated) in the corresponding rear axle 69 and front axle 70 and secured with nuts (not illustrated). Accordingly, as illustrated in FIGS. 13-16, in some applications, each rear roller frame mount arm 24a (FIG. 9) and each front roller frame arm 24b (FIG. 7) may be removed from the corresponding rear axle 69 and front axle 70 by unfastening the securing nuts 47 from the respective block fasteners 46. As illustrated in FIGS. 15 and 16, the rear roller frame mount arm 24a (FIG. 9) and the front roller mount frame arm 24b (FIG. 7) may then be lowered from the corresponding rear axle 69 and front axle 70 as the base mount blocks 45, the left camber block spacer 50 and the right camber block spacer 51 typically remain attached to the rear axle 69 and front axle 70.

As illustrated in FIGS. 7, 9-12 and 25, in some embodiments, two connecting rods 56, one front and one rear, may connect the front roller frame mount arms 24b of the respective front track assemblies 2b to each other and the rear roller frame mount arms 24a of the respective rear track assemblies 2a to each other. In some embodiments, a pair of connecting rods 56 may connect the rear roller frame mount arms 24a to each other in front of and behind, respectively, the rear axle 69. In like manner, a pair of connecting rods 56 may connect the front roller frame mount arms 24b to each other in front of and behind, respectively, the front axle 70. Rod threads 57 may terminate the respective ends of each connecting rod 56. Accordingly, each threaded end of each connecting rod 56 may be inserted through a rod eye 26 (FIGS. 13-16) on the shaft frame 25 of each corresponding rear roller frame mount arm 24a and front roller frame mount arm 24b. Nuts 58 may be threaded on the rod threads 57 to secure each end of each connecting rod 56 in the corresponding rod eye 26.

As illustrated in FIGS. 9 and 21-24, in some embodiments, a skid pan assembly 78 may be deployed in place beneath the connecting rods 56 which connect the rear track assemblies 2a to each other and the front assemblies 2b to each other on the rear axle 69 and the front axle 70. The skid pan assembly 78 may extend beneath the corresponding rear axle 69 and front axle 70 to protect the vehicle differential 90 (FIG. 24) and other under-components of the vehicle chassis 67. The skid pan assembly 78 may include an elongated skid pan 79. A pair of front and rear pan flanges 80 may angle upwardly from the skid pan 79. A pair of end pan flanges 81 may extend from opposite ends of the skid pan 79. As illustrated in FIG. 21, a pair of pan mount brackets 84, typically having flange fastener openings 85, may secure the end pan flanges 81 of the skid pan 79 to the respective rear roller frame mount arms 24a and front roller mount frame arms 24b or other component of each corresponding pair of rear track assemblies 2a and front track assemblies 2b. As illustrated in FIGS. 9 and 24, a connecting rod clamp plate 92 may secure each front and rear pan flange 80 of each skid pan 79 to each corresponding connecting rod 56. The connecting rod clamp plate 92 may be secured to the corresponding front or rear pan flange 80 using a pair of clamp plate fasteners 93.

As illustrated in FIGS. 22-24, an elongated differential guard support member 88 may extend upwardly from the skid pan 79. A differential guard panel 89 may be supported by the differential guard support member 88. Accordingly, in the installed skid pan assembly 78, the differential guard panel 89 may be situated beneath the vehicle differential 90 of the forestry harvester vehicle 66 to impart additional protection to the vehicle differential 90.

In typical application, the interchangeable track assembly 1 can be deployed on the forestry harvester vehicle 66 in interchangeable relationship to the vehicle wheels 74 (FIG. 8) depending on the type of soil or terrain which the forestry harvester vehicle 66 will traverse during the logging operation. Some types of soil or terrain may be better suited to use of the vehicle wheels 74. Accordingly, as illustrated in FIG. 8, the vehicle wheels 74 may be coupled to the rear axle 69 (FIG. 9) and the front axle 70 typically at the wheel attachment interface 61 (FIGS. 7 and 10) using lug bolts and nuts or the like.

In some applications, the rear roller frame mount arm 24a and the front roller frame mount arm 24b of each corresponding rear track assembly 2a and front track assembly 2b may remain attached to the corresponding end of the rear axle 69 and front axle 70 with either the vehicle wheels 74 or the rear track assemblies 2a and front track assemblies 2b of the interchangeable track system 1 deployed on the forestry harvester vehicle 66. Each rear roller frame mount arm 24a and each front roller frame mount arm 24b may be mounted on the corresponding rear axle 69 and front axle 70 by assembly of the corresponding rear arm mount assembly 44a and front arm mount assembly 44b, typically as was heretofore described with respect to FIGS. 13-20.

In the event that the interchangeable track assembly 1 is deemed more suitable for traversing some types of soil or terrain than the vehicle wheels 74, the vehicle wheels 74 may initially be removed from the respective wheel attachment interfaces 61 on the rear axle 69 and front axle 70. The sprocket 60 may be attached to the wheel attachment interface 61 on the rear axle 69 and the front axle 70 typically using the sprocket fasteners 64 as was heretofore described with respect to FIGS. 7,12 and 25.

A forklift (not illustrated) may then be used to raise each of the rear track assembly 2a and the front track assembly 2b and facilitate alignment or registration of the pivot shaft opening 8 (FIG. 6) in each roller frame 3 with the roller frame pivot mount shaft 32 of each corresponding rear roller frame mount arm 24a and front roller frame mount arm 24b. Engagement of the forklift with the rear track assembly 2a or front track assembly 2b may be carried out by extending the forklift blade on the forklift into the forklift insertion frame 36 on the rear roller frame mount arm 24a or front roller frame mount arm 24b. The forklift may then be operated to move the rear track assembly 2a or front track assembly 2b medially (toward the longitudinal midline of the forestry harvester vehicle 66) until the roller frame pivot mount shaft 32 inserts through the pivot shaft opening 8 in the roller frame 3. Simultaneously, the sprocket 60 may mesh with the track 62 for driving engagement. The shaft cap 40 may then be secured on the end of the roller frame pivot mount shaft 32 to retain the roller frame 3 thereon.

Figure 26:
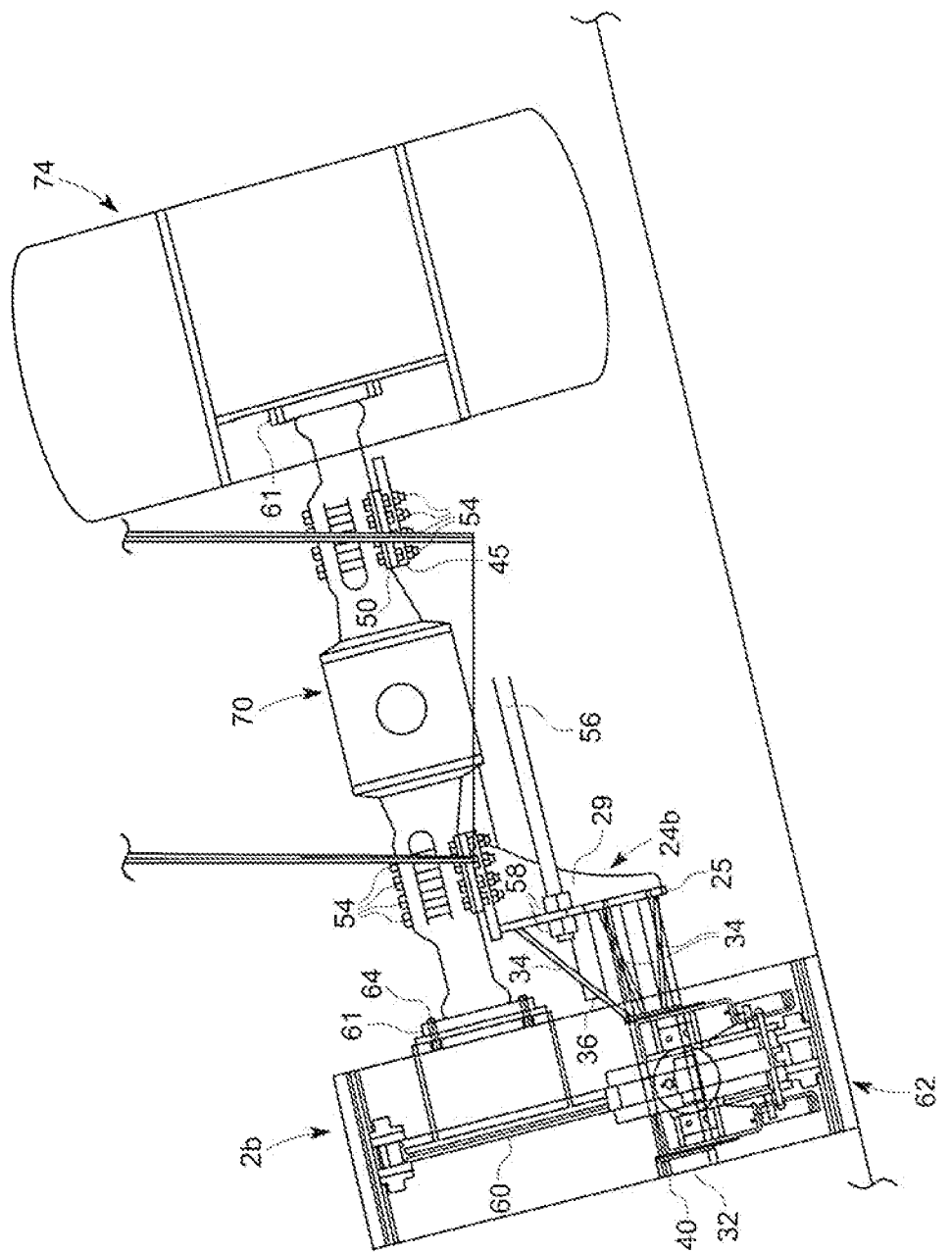
FIG. 26 is a front view of the front axle of the vehicle with one vehicle wheel mounted on one end of the front axle and a front track assembly mounted on the other end of the front axle and engaging sloped ground, and further illustrating higher ground clearance on the track side relative to the wheel side of the vehicle.

The forestry harvester vehicle 66 may be operated over soft, hilly or mountainous terrain to delimb and buckle trees typically using the grapple 71 (FIG. 1) and the push blade 72 in the conventional manner. As illustrated in FIG. 8, the rear axle 69 (and front axle 70) may be disposed at a level orientation relative to the vehicle chassis 67 of the forestry harvester vehicle 66 as the rear track assemblies 2a and front track assemblies 2b traverse level terrain %. As illustrated in FIG. 26, at least the front axle 70 may be capable of pivoting vertically relative to the vehicle chassis 67, typically via a chassis pivot point 73, such that the front track assemblies 2b can engage sloped terrain 97. As illustrated in FIG. 3, the roller frame 3 of each rear track assembly 2a and each front track assembly 2b may be capable of pivoting forwardly and rearwardly about the corresponding roller frame mount arm 24 to accommodate variations in the terrain during the forestry operation. As illustrated in FIGS. 4 and 5, because of the independent mounting of the rear track assemblies 2a and the front track assemblies 2b to the rear axle 69 and front axle 70, respectively, the forestry harvester vehicle 66 is capable of steering without interference. In the event that the forestry harvester vehicle 66 rises and falls due to uneven terrain, the skid pan assembly 78 may protect the rear axle 69, the front axle 70, the vehicle differential 90 (FIG. 24) and/or other under-components of the vehicle chassis 67 from damage or puncture by rocks, stumps and the like.

In the event that it is deemed necessary to remove the rear track assemblies 2a and the front track assemblies 2b of the interchangeable track system 1 from the forestry harvester vehicle 66 and deploy the vehicle wheels 74 on the rear axle 69 and the front axle 70, the rear track assemblies 2a and the front track assemblies 2b may be removed from the respective rear roller frame mount arms 24a and front roller frame mount arms 24b typically by reversing the steps described above.

Figure 12:
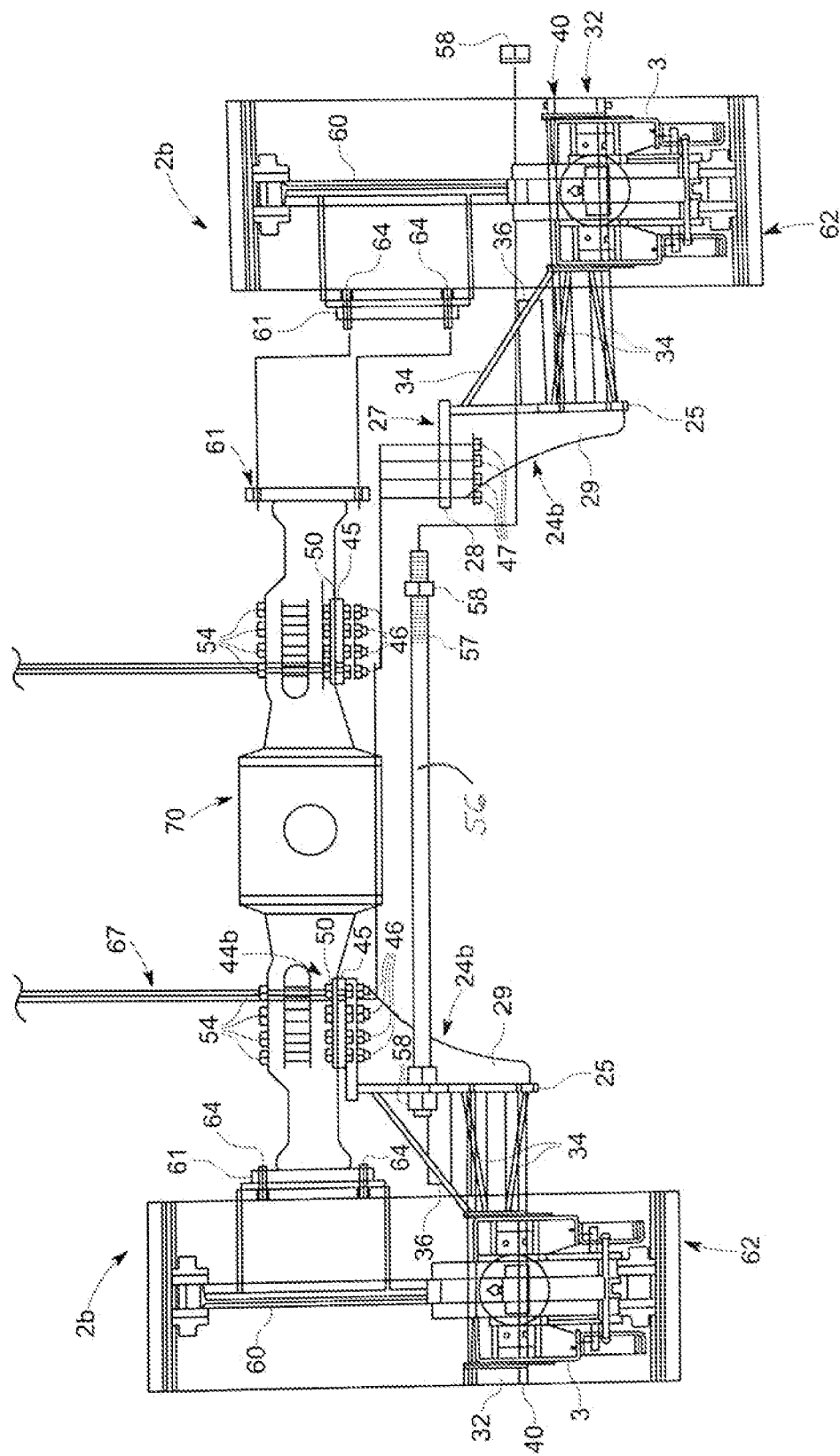
FIG. 12 contrasts an exploded front view of the interchangeable track system, more particularly illustrating a typical one-step method of deploying the system on and removing the system from the front axle of the forestry harvester vehicle.

As illustrated in FIG. 12, in some applications, the rear roller frame mount arms 24a and the front roller frame mount arms 24b may be removed from the respective rear axle 69 and front axle 70 along with the rear track assemblies 2a and the front track assemblies 2b. Accordingly, the forklift blade of a forklift may initially be extended into the forklift insertion frame 36 of each rear roller frame mount arm 24a and each front roller frame mount arm 24b. As illustrated in FIGS. 15 and 16, the nuts 47 may be removed from the respective block fasteners 46 which attach the top frame plate 28 of each rear roller frame mount arm 24a and each front roller frame mount arm 24b to the front and rear base mount blocks 45 of the rear arm mount assembly 44a and the front arm mount assembly 44b. The forklift may then be operated to lower the rear roller frame mount arm 24a or front roller mount frame arm 24b from the corresponding rear axle 69 or front axle 70, and the vehicle wheels 74 may be replaced on the rear axle 69 and front axle 70 typically as was heretofore described.

It will be appreciated by those skilled in the art that the interchangeable track system 1 can be used to replace conventional round tires with substantially flattened ground-contouring steel track units that enhance power through overall gear ratio reduction. The resulting extra power eases stress on engine and powertrain components. Moreover, through the pivot shaft support system, vehicle weight is separated from the front and rear axle wheel bearings. A beneficial byproduct is the capability to transfer the tracked components into a new or different vehicle in the event that the vehicle is sold or retired.

It will be further appreciated by those skilled in the art that the interchangeable track system accomplishes all of the following through the design and implementation of its components:
A). greatly reduced ground pressure with added aggressive traction characteristics:
  a). reduced impact on forested land; and
  b). greater ability to operate on steeply sloped jobsites.
B). higher ground clearance
  a). reduced contact with stumps and other obstacles.
C). lower center of gravity
  a). enables stability on extreme slopes, even traversed
D). Adaptability to transfer between other machines.

While certain illustrative embodiments of the disclosure have been described above. it will be recognized and understood that various modifications can be made to the embodiments and the appended claims are intended to cover all such modifications which may fall within the spirit and scope of the disclosure.

What is claimed is:

1. An interchangeable track system for interchangeable deployment with vehicle wheels on a forestry harvester vehicle having a front axle and a rear axle, comprising: a pair of front roller frame mount arms and a pair of rear roller frame mount arms configured for mounting on the front axle and the rear axle, respectively, of the forestry harvester vehicle, each of the pair of front roller frame mount arms and the pair of rear roller frame mount arms including: a shaft frame; a top frame plate carried be the shaft frame, the plate frame plate configured for removable and direct mounting on each corresponding one of the front axle and rear axle, the top frame plate substantially perpendicular to a plane of the shaft frame; and an elongated roller frame pivot mount shaft extending from the shaft frame; and a pair of front track assemblies and a pair of rear track assemblies configured for removable mounting on the pair of front roller flame mount arms and the pair of rear roller frame mount arms, respectively, each of the pair of front track assemblies and the pair of rear track assemblies including: an elongated roller frame configured for pivotal attachment to each corresponding one of the pair of front roller frame mount arms and the pair of rear roller frame mount arms; a front idler roller and a rear idler roller carried by the roller frame; a track trained on the front idler roller and the rear idler roller; and a sprocket configured for driving engagement by a corresponding one of the front axle and the rear axle, the sprocket drivingly engaging the track.

2. The interchangeable track system of claim 1 further comprising a pair of front arm mount assemblies configured for mounting the pair of front roller frame mount arms, respectively, to the front axle and a pair of rear arm mount assemblies configured for mounting the pair of rear roller frame mount arms, respectively, to the rear axle.

3. The interchangeable track system of claim 1 further comprising a front skid pan assembly having a front skid pan carried by the pair of front roller frame mount arms and a rear skid pan assembly having a rear skid pan carried by the pair of rear roller frame mount arms.

4. The interchangeable track system of claim 3 wherein each of the front skid pan assembly and the rear skid pan assembly comprises an elongated skid pan, a pair of front and rear pan flanges angling upwardly from the skid pan and a pair of end pan flanges extending from opposite ends of the skid pan.

5. An interchangeable track system for interchangeable deployment with vehicle wheels on a forestry harvester vehicle having a front axle and a rear axle, comprising:
a pair of detachable front roller frame mount arms and a pair of detachable rear roller frame mount arms configured for mounting on the front axle and the rear axle, respectively, each of the pair of detachable front roller frame mount arms and the pair of detachable rear roller frame mount arms including:
  a shaft frame;
  an arm mount frame carried by the shaft frame, the arm mount frame having:
    a top frame plate extending from the shaft frame, the top frame plate configured for removable mounting on the corresponding one of the front axle and the rear axle, respectively, of the forestry harvester vehicle; and
    a pair of parallel, spaced-apart side frame plates extending from the shaft frame beneath the top frame plate;
  an elongated roller frame pivot mount shaft extending from the shaft frame; and
  a forklift insertion frame extending from the shaft frame;
a pair of front arm mount assemblies configured for mounting the top frame plate on the arm mount frame of each corresponding one of the pair of detachable front roller frame mount arms to the front axle and a pair of rear arm mount assemblies configured for mounting the top frame plate on the arm mount frame of each corresponding one of the pair of detachable rear roller frame mount arms to the rear axle, each of the pair of front arm mount assemblies and the pair of rear arm mount assemblies including:
  a pair of elongated, parallel, spaced-apart front and rear base mount blocks carried by the top frame plate on the arm mount frame of each corresponding one of
the pair of detachable front roller frame mount arms
and the pair of detachable rear roller frame mount
arms;
a plurality of block fasteners removably fastening the
front and rear base mount blocks to the top frame
plate;
a left camber block spacer and a right camber block
spacer carried by the front and rear base mount
blocks, respectively; and
a plurality of axle fasteners configured for engaging the
corresponding rear axle and front axle and the left
camber block spacer and the right camber block
spacer, respectively;
a pair of front track assemblies and a pair of rear track
assemblies configured for removable mounting on the
pair of detachable front roller frame mount arms and
the pair of detachable rear roller frame mount arms,
respectively, each of the pair of front track assemblies
and the pair of rear track assemblies including:
an elongated roller frame configured for pivotal attachment to each corresponding one of the pair of detachable front roller frame mount arms and the pair of detachable rear roller frame mount arms;
a pivot shaft opening extending through the roller frame at a center of gravity of the roller frame, the roller frame pivot mount shaft of each corresponding one of the pair of detachable from roller frame mount arms and the pair of detachable rear roller frame mount arms extending through the pivot shaft opening to pivotally mount the roller frame on the roller frame pivot mount shaft;
a front idler roller and a rear idler roller carried by the roller frame;
a track trained on the front idler roller and the rear idler roller; and
a sprocket configured for detachable driving engagement by each corresponding one of the front axle and the rear axle, the sprocket drivingly engaging the track;
a pair of front and rear connecting rods connecting the shaft frame of each corresponding one of the pair of detachable front roller frame mown arms, respectively, to each other; and
a pair of front and rear connecting rods connecting the shaft frames of the pair of detachable rear roller frame mount arms, respectively, to each other.

6. An interchangeable track system for interchangeable deployment with vehicle wheels on a forestry harvester vehicle having a front axle and a rear axle, comprising:
a pair of front roller frame mount arms and a pair of rear roller frame mount arms configured for mounting on the front axle and the rear axle, respectively, of the forestry harvester vehicle; and
a pair of front track assemblies and a pair of rear track assemblies configured for removable mounting on the pair of front roller frame mount arms and the pair of rear roller frame mount arms, respectively, each of the pair of front track assemblies and the pair of rear track assemblies including:
an elongated roller frame configured for pivotal attachment to each corresponding one of the pair of front roller frame mount arms and the pair of rear roller frame mount arms;
a front idler roller and a rear idler roller carried by the roller frame;
a track trained on the front idler roller and the rear idler roller; and
a sprocket configured for driving engagement by a corresponding one of the front axle and the rear axle, the sprocket drivingly engaging the track;
a pair of front arm mount assemblies configured for mounting the pair of front roller frame mount arms, respectively, to the front axle and a pair of rear arm mount assemblies configured for mounting the pair of rear roller frame mount arms, respectively, to the rear axle; and
wherein each of the pair of front arm mount assemblies and the pair of rear arm mount assemblies comprises a pair of elongated, parallel, spaced-apart front and rear base mount blocks carried by each corresponding one of the pair of front roller frame mount arms and the pair of rear roller frame mount arms; a left camber block spacer and a right camber block spacer carried by the from and rear base mount blocks, respectively; and a plurality of axle fasteners engaging the corresponding rear axle and front axle and the left camber block spacer and the right camber block spacer, respectively.

7. The interchangeable track system of claim 1 further comprising at least one connecting rod connecting the pair of front roller frame mount arms to each other and at least one connecting rod connecting the pair of rear roller frame mount arms to each other.

8. The interchangeable track system of claim 7 wherein the at least one connecting rod connecting the pair of front roller frame mount arms to each other comprises a pair of front and rear connecting rods connecting the pair of front roller frame mount arms to each other and the at least one connecting rod connecting the pair of rear roller frame mount arms to each other comprises a pair of front and rear connecting rods connecting the pair of rear roller frame mount arms to each other.

9. The interchangeable track system of claim 1 further comprising a forklift insertion frame carried by each corresponding one of the pair of front roller frame mount arms and the pair of rear roller frame mount arms.

10. An interchangeable track system for interchangeable deployment with vehicle wheels on a forestry harvester vehicle having a front axle and a rear axle, comprising: a pair of detachable front roller frame mount arms and a pair of detachable rear roller frame mount configured for removable mounting on the front axle and the rear axle, respectively, of the forestry harvester vehicle, each of the pair of detachable front roller frame mount arms and the pair of detachable rear roller frame mount arms including: a shaft frame; a top frame plate carried by the shaft frame, the top frame plate configured for removable and direct mounting on each corresponding one of the front axle and the rear axle, the top frame plate substantially perpendicular to a plane of the shaft frame; an elongated roller frame pivot mount shaft extending from the shaft frame; and a plurality of shaft mount plates extending between the shaft frame and the roller frame pivot mount shaft; a pair of front track assemblies and a pair of rear track configured for removable mounting on the pair of detachable front roller frame mount arms and the pair of detachable rear roller frame mount arms, respectively, each of the pair of front track assemblies and the pair of rear track assemblies including: an elongated roller frame configured tor pivotal attachment to each corresponding one of the pair of detachable front roller frame mount arms and the pair of detachable rear roller frame mount arms; a pivot shaft opening extending through the roller frame at a center of gravity of the roller frame, the roller frame pivot mount shaft of each corresponding one of the pair of detachable front roller frame mount arms and the pair of detachable rear roller frame mount arms extending through the pivot shaft opening to pivotally mount the roller frame on the roller frame pivot mount shaft; a front idler roller and a rear idler roller carried by the roller frame; a track trained on the front idler roller and the rear idler roller; and a sprocket configured for detachable driving engagement by each corresponding one of the front axle and the rear axle, the sprocket drivingly engaging the track.

11. The interchangeable track system of claim 10 further comprising a pair of front arm mount assemblies configured for mounting the top frame plate of each corresponding one of the pair of detachable front roller frame mount arms to the front axle and a pair of rear arm mount assemblies configured for mounting the top frame plate of each corresponding one of the pair of detachable rear roller frame mount arms to the rear axle.

12. The interchangeable track system of claim 10 further comprising at least one connecting rod connecting the shaft frame of the pair of detachable front roller frame mount arms, respectively, to each other and at least one connecting rod connecting the shaft frame of the pair of detachable rear roller frame mount arms, respectively, to each other.

13. The interchangeable track system of claim 12 wherein the at least one connecting rod connecting the shaft frame of the pair of detachable front roller frame mount arms, respectively, to each other comprises a pair of front and rear connecting rods connecting the shaft frame of the pair of detachable front roller frame mount arms, respectively, to each other and the at least one connecting rod connecting the shaft frame of the pair of detachable rear roller frame mount arms, respectively, to each other comprises a pair of front and rear connecting rods connecting the shaft frame of the pair of detachable rear roller frame mount arms, respectively, to each other.

14. The interchangeable track system of claim 10 further comprising a forklift insertion frame extending from the shaft frame each corresponding one of the pair of detachable front roller frame mount arms and the pair of detachable rear roller frame mount arms.

15. The interchangeable track system of claim 10 further comprising a front skid pan assembly having a front skid pan carried by the pair of detachable front roller frame mount arms and a rear skid pan assembly having a rear skid pan carried by the pair of detachable rear roller frame mount arms.

16. The interchangeable track system of claim 15 wherein each of the front skid pan assembly and the rear skid pan assembly comprises an elongated skid pan, a pair of front and rear pan flanges angling upwardly from the skid pan and a pair of end pan flanges extending from opposite ends of the skid pan.

17. The interchangeable track system of claim 5 wherein the shaft frame of each of the pair of detachable rear roller frame mount arms has a parallelogram shape.

18. The interchangeable track system of claim 5 further comprising a front skid pan assembly having a front skid pan carried by the pair of detachable front roller frame mount arms and a rear skid pan assembly having a rear skid pan carried by the pair of detachable rear roller frame mount arms.

19. The interchangeable track system of claim 18 wherein each of the front skid pan assembly and the rear skid pan assembly comprises an elongated skid pan, a pair of front and rear pan flanges angling upwardly from the skid pan and a pair of end pan flanges extending from opposite ends of the skid pan.

20. An interchangeable track system for interchangeable deployment with vehicle wheels on a forestry harvester vehicle having a front axle and arear axle, comprising:
  a pair of detachable front roller frame mount arms and a pair of detachable rear roller frame mount arms configured for removable mounting on the front axle and the rear axle, respectively, of the forestry harvester vehicle, each of the pair of detachable front roller frame mount arms and the pair of detachable rear roller frame mount arms including:
    a shaft frame;
    a top frame plate carried bar the shaft frame the top frame plate configured for removable mounting on each corresponding one of the front axle and the rear axle; and
    an elongated roller frame pivot mount shaft extending from the shaft frame;
  a pair of front track assemblies and a pair of rear track assemblies configured for removable mounting on the pair of detachable front roller frame mount arms and the pair of detachable rear roller frame mount arms, respectively, each of the pair of front track assemblies and the pair of rear track assemblies including:
    an elongated roller frame configured for pivotal attachment to each corresponding one of the pair of detachable front roller frame mount arms and the pair of detachable rear roller frame mount arms;
    a pivot shaft opening extending through the roller frame at a center of gravity of the roller frame, the roller frame pivot mount shaft of each corresponding one of the pair of detachable front roller frame mount arms and the pair of detachable rear roller frame mount arms extending through the pivot shaft opening to pivotally mount the roller frame on the roller frame pivot mount shaft;
    a front idler roller and a rear idler roller carried by the roller frame;
    a track trained on the front idler roller and the rear idler roller; and
    a sprocket configured for detachable driving engagement by each corresponding one of the front axle and the rear axle, the sprocket drivingly engaging the track;
  a pair of front arm mount assemblies configured for mounting the top frame plate of each corresponding one of the pair of detachable front roller frame mount arms to the front axle and a pair of rear arm mount assemblies configured for mounting the top frame plate of each corresponding one of the pair of detachable rear roller frame mount arms to the rear axle; and
  wherein each of the pair of front arm mount assemblies and the pair of rear arm mount assemblies comprises a pair of elongated, parallel, spaced-apart front and rear base mount blocks carried by the top frame plate of each of the pair of detachable front roller frame mount arms and the pair of detachable rear roller frame mount arms: a left camber block spacer and a right camber block spacer carried by the front and rear base mount blocks, respectively; and a plurality of axle fasteners removably engaging the corresponding rear axle and front axle and the left camber block spacer and the right camber block spacer, respectively.

* * * * *